United States Patent [19]

Nielsen

[11] E Re. 29,083

[45] Reissued Dec. 21, 1976

[54] ATOMIZER WHEEL FOR THE ATOMIZATION OF SUSPENSIONS OF HARD-WEARING MATERIALS

[75] Inventor: Kaj Nielsen, Bagsvaerd, Denmark

[73] Assignee: Aktieselskabet Niro Atomizer, Soborg, Denmark

[22] Filed: Aug. 21, 1973

[21] Appl. No.: 389,637

Related U.S. Patent Documents

Reissue of:

[64] Patent No.: 3,454,226
Issued: July 8, 1969
Appl. No.: 536,326
Filed: Mar. 22, 1966

[30] Foreign Application Priority Data

Mar. 26, 1965 Denmark ..... 1602/65

[52] U.S. Cl. ..... 239/224; 159/4 S; 233/14 R; 233/47 R; 239/591

[51] Int. Cl.[2] ..... B05B 3/10; B04B 11/00

[58] Field of Search ..... 239/223, 224, 228, 600, 239/591; 233/14 R, 20 R, 20 A, 27, 28, 32, 47 R, 47 A, 46; 159/4 F, 4 S, 4 SR, 48 R, 48 L

[56] References Cited

UNITED STATES PATENTS

| | | | |
|---|---|---|---|
| 2,645,415 | 7/1953 | Strezynski | 233/28 |
| 2,695,748 | 11/1954 | Millard | 233/47 |
| 2,889,873 | 6/1959 | Sauter | 159/4 S |
| 3,079,069 | 2/1963 | Thylefors | 233/46 X |
| 3,094,487 | 6/1963 | Van Arsdell | 233/46 X |
| 3,108,952 | 10/1963 | Antz | 233/14 |
| 3,228,598 | 1/1966 | Keith | 233/47 X |

*Primary Examiner*—Evon C. Blunk
*Assistant Examiner*—Andres Kashnikow
*Attorney, Agent, or Firm*—Stevens, Davis, Miller & Mosher

[57] ABSTRACT

An atomizer wheel comprising an annular chamber provided with a number of conical outlet holes lined with bushings extending a distance into the chamber.

11 Claims, 4 Drawing Figures

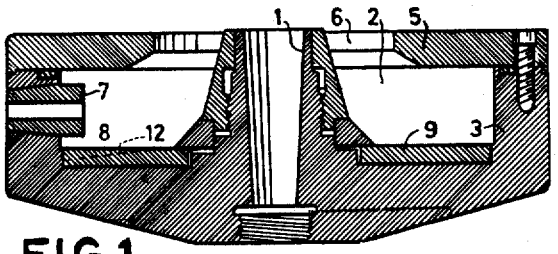
FIG.1
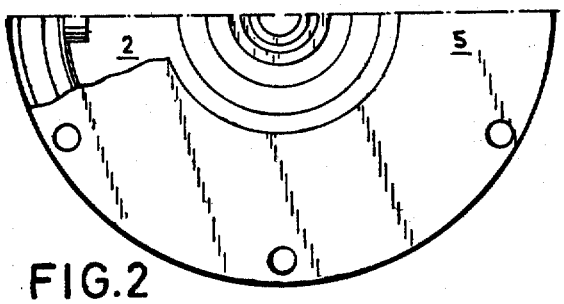
FIG.2
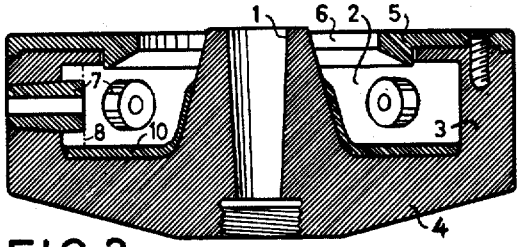
FIG.3
FIG.4
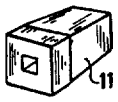

ATOMIZER WHEEL FOR THE ATOMIZATION OF SUSPENSIONS OF HARD-WEARING MATERIALS

Matter enclosed in heavy brackets [ ] appears in the original patent but forms no part of this reissue specification; matter printed in italics indicates the additions made by reissue.

This invention relates to an atomizer wheel for the atomization of suspensions of hard-wearing materials and of the type which concentrically with the hub of the wheel has an annular bowl-shaped space in the substantially cylindrical outer wall of which there are provided a plurality of discharge openings having linings of a wear-resistant sintered material.

In this case "sintered material" means a material where the hard grains are stably interconnected no matter whether such interconnection has been effected by fusing together the surfaces of the grains or by embedding the grains in some basic substance such as, by way of example, is being used in the manufacture of wolfram carbide bodies.

In the atomization of suspensions which contain solid particles of a hard material, especially sharp edged particles, for example a suspension of ceramic clay, a very hard water is taking place on account of the very high velocities of discharge from the atomizer wheel caused by the centrifugal force. Thus, a conventional atomizer wheel made of the commonly used wear-resistant types of steel, will have an extremely short lifetime, sometimes only a few hours or even less before they have become so heavily worn as to be entirely unserviceable.

With a view to reducing the wear it is known to employ wear-resistant sintered materials in such places where the wear occurs.

On account of their hardness such sintered materials are practically speaking not machinable so that the wear-resistant parts to be used must be produced in their final shape by sintering which in conjunction with the circumstance that they do in all essentials only withstand compressive forces and must not, on account of their brittleness, be exposed to tensile or bending stresses of significance, has the effect that they only lend themselves to be produced in very simple geometric shapes.

There is known an atomizer wheel of the type concerned having slot discharge openings where plates of such sintered material are inserted into the slot openings at the walls thereof across which the discharge is taking place. The plates are loosely disposed for the very reason of avoiding bending stresses and are retained by their end edges engaging a projecting edge provided at the external opening of the slot, against which latter edge they are firmly pressed by the centrifugal force during rotation of the wheel. This measure prolongs the lifetime of the wheel to some extent but it proves in practice that this is nevertheless only a rather limited improvement in that the liquid is by the centrifugal force pressed in between the loosely deposited plates and the adjoining surface of the wheel proper whereby the material of the wheel is quickly worn to such extent as to make the wheel discardable.

Instead of the slot openings one has tried to use cylindrical holes in which there are disposed bushings of a wear-resistant sintered material but in this case it proves that the outer wall of the wheel is worn in the area surrounding the bushings so that the wheel is discardable after a few hours of operation so that practically no improvement is obtained by using the wear-resistant bushings.

The invention has for its object to provide an atomizer wheel of the type concerned in connection with which a very considerable increase of the lifetime is obtained. One object of the invention is to provide the holes with linings of tapered bushings of wear-resistant sintered material, projecting into the bowl-shaped space.

As a consequence of the tapered shape of the bushings they are during operation of the wheel pressed firmly against the correspondingly shaped wall surfaces of the openings by the centrifugal force so that any discharge of liquid between the bushings and the material of the wheel proper is avoided. As the bushings extend a distance into the annular space in the wheel, a layer of liquid will deposit on the outer wall during the rotation of the wheel. Owing to the centrifugal forces the heavier parts of the layer i.e. the suspended solid material is separated from the liquid in the layer and deposited directly on the wall so as to fill the area surrounding the inwardly extending portions of the bushings. The coating thus obtained is, to be sure, not wear-resistant in the proper sense of the word in that it consists of loosely interconnected particles which are incessantly torn way from the surface of the layer by the suspension flowing towards the openings of the bushings but the centrifugation of particles out into said layer will continuously have the effect that the torn-away particles are replaced by fresh particles so that the parts of the coating adjoining the wall are preserved and preclude any wear of said wall. In practice it proves that in this way lifetime can increase several hundred times.

Although the bushings consist of the said wear-resistant sintered material, they will nevertheless be subject to wear but they are readily replaceable because they are only kept in place by the centrifugal force which, as a matter of fact, is inoperative when the wheel is at rest. The wear to which the bushings are exposed is unilateral and their lifetime may, therefore, be increased by turning them gradually as they are worn.

The openings of the bushings may by way of example have a circular cross section but preferably they are of a square cross section. The square cross section determines four different well-defined positions of the bushings. Further the wearing surfaces are plane which has proved to involve a longer lifetime than curved wearing surfaces.

A wearing groove may be produced in the annular space at the place where the surface of said coating adjoins the bottom of the wheel. This wear may be essentially reduced when the bottom of the bowl-shaped space has a conical shape sloping outwardly towards the outer wall.

In a particular embodiment of the atomizer wheel according to the invention a layer of a wear-resistant material is provided on the bottom surface of the bowl-shaped space made for either in the shape of an embedded annular plate or a sintered surface coating at any rate in the outermost part of the bottom surface. In this place the wear may be less hard than in the bushings proper and through a surface coating of wear-resistant material it is possible to obtain the advantage that the lifetime of the wheel proper becomes a length sufficient for permitting the bushings being replaced a number of times before the wheel is discardable. If using an embedded ring this ring can also be replaced and, consequently, the longest imaginable lifetime of the wheel is attained.

Sometimes it may be difficult or at any rate expensive to produce the said annular plate of sintered material, but excellent results are also obtained by using a ring of a wear-resistant metal alloy because the wear at this place is, as mentioned above, less hard than in the discharge openings.

The invention will be particularly explained below with reference to the accompanying drawings.

FIG. 1 shows a sectional view an embodiment of the atomizer wheel according to the invention.

FIG. 2 the same atomizer wheel as seen from the supply side.

FIG. 3 shows a modified embodiment of the atomizer wheel in a sectional view.

FIG. 4 a modification of a part of the atomizer wheel shown in FIGS. 1 or 3.

The wheel illustrated in FIG. 1 is substantially of bowl-shape with a centrally disposed hub 1 whereby an annular space 2 appears between the hub 1 and the outer wall 3 of the wheel which space is further defined by the wheel portion 4 connecting the hub 1 with the outer wall 3 and forming the bottom of the annular space 2. Further, an annular cover plate 5 is secured to the upper side of the wheel, said cover plate surrounding the hub 1 in such a manner as to form between said hub and the annular plate 5 an annular opening 6 leading into the space 2.

The wheel is intended for being mounted into a known spray-drying apparatus on a shaft which during operation rotates at a very high velocity, a suspension being supplied to the space through the opening 6 and precipitated in atomized form through openings in the side wall 3 to a surrounding drying chamber wherein the fine particles formed by the atomization are dried so that their contents of solid matter fall to the bottom of the drying chamber in the form of a fine powder.

FIGS. 1 and 2 show a single one of said openings, and according to the invention a bushing 7 of a wear-resistant sintered material, for example wolfram carbide, silicon carbide, aluminum oxide or tetraboron carbide, is disposed in each of said openings.

These bushings 7 have conical outer surfaces with outwardly decreasing diameter and, consequently, they can be loosely disposed in said openings as they are pressed outwardly by the centrifugal force when the wheel is rotated and, consequently, they are immovably and tightfitting secured in the openings in the outer wall.

At their outer ends the bushings 7 are preferably ground flush with the cylindrical outer surface of the wheel whilst their inwardly facing ends extend a distance into the space 2 beyond the outer wall 3 as seen in FIG. 1.

When the wheel commences to rotate the surroundings of the bushings adjoining the outer wall will very quickly be filled with a layer of the suspension as a consequence of the effect of the centrifugal force, as indicated by a dotted line 8. By the centrifuging effect the material of this layer is quickly separated so that the heavier parts, i.e. the contents of solid wearing particles will adopt [ the ] *an* outer position [ closed ] *close* to the outer wall 3, [ whilst ] *while* the lighter parts, i.e. the liquid will lie innermost. In this manner the surroundings of the bushings 7 are quickly filled with a layer of these solid particles which will thus protect the material of the wheel proper from wear.

A certain wearing effect may occur at the bottom of the space 2 and primarily at the vicinity of the bordering line 8 for the material deposited on the outer wall 3. For the purpose of preventing the wheel from being quickly ruined by this wearing effect, an annular plate 9 of a wear-resistant material is embedded at the bottom of the space. If deemed appropriate, this material may likewise be a hard sintered material but since this area is subject to somewhat less wear it will often suffice to use a wear-resistant metal alloy, for example a wear-resistant type of steel.

The embodiment shown in FIG. 3 differs from that shown in FIG. 1 in that instead of the annular plate 9 a layer 10 of a wear-resistant material has been applied to the bottom of the space 2, said layer extending a distance upwardly along the hub 1. Since the said layer is not replaceable in the same manner as that used in FIG. 1, it may be expedient that said layer consists of a wear-resistant sintered material.

FIG. 4 shows a modified embodiment of the bushings having square cross-section instead of circular cross-section as shown in FIGS. 1 and 3. The bushings are tapered at least over part of its length 11 corresponding to the conical part of the bushings 7 in FIGS. 1 and 3.

The bottom of the annular space may be conically sloping outwards from the hub 1 as indicated in FIG. 1 by means of a dotted line 12.

I claim:

1. An atomizer wheel comprising a hub, an outer wall part coaxially disposed about said hub and a bottom part connecting said outer wall part with said hub, said outer wall part, said hub, and said bottom part defining between them an annular chamber, a ring-shaped cover member detachably connected to said outer wall part, said cover member having an inner circumference defining together with said hub an unobstructed space in communication with said annular chamber, said outer wall part being provided with a plurality of regularly shaped holes uniformly distributed around the circumference of the outer wall part, said holes forming the only outlet openings of the wheel, each of said holes being lined with bushing of wear-resistant sintered material, said holes and said bushings being tapered in direction radially outwardly from said chamber, the inner end of each of said bushings projecting into said chamber while their outer ends are substantially flush with the outside of said outer wall part.

2. An atomizer wheel as claimed in claim 1, wherein said bushings have circular cross-sections.

3. An atomizer wheel as claimed in claim 1, wherein said bushings have square shaped cross-sections.

4. An atomizer wheel as claimed in claim 1, wherein a plate of wear-resistant material is embedded in the surface of said bottom part, facing said annular chamber.

5. An atomizer wheel as claimed in claim 1, wherein said bottom part has a sintered wear-resistant surface coating facing said annular chamber.

6. An atomizer wheel as claimed in claim 1, wherein said bottom part has a conical surface sloping outwards from said hub within said annular chamber.

7. An atomizer wheel comprising a hub, an outer wall member coaxially disposed about said hub, a bottom member connecting said outer wall member with said hub, the upper surface of said bottom member being of a wear-resistant material, said outer wall member, said hub, and said bottom member defining between them an annular chamber, a ring-shaped cover member detachably connected to said outer wall member, said cover member having an inner circumference defining, together with said hub, an inlet opening in communication with said annular chamber, said outer wall member being provided with a plurality of uniform outlet openings uniformly distributed about the periphery of the outer wall part and forming the only outlet openings of said wheel, and a bushing of wear-resistant sintered material extending radially through each opening and projecting into said chamber, said holes and said bushings being tapered in a direction radially outward from said chamber.

*8. The atomizer wheel of claim 1 in which each of the holes is tapered over its entire length.*

*9. The atomizer wheel of claim 8 in which the portion of the bushing corresponding to the tapered portion of the hole is correspondingly externally tapered in the outward direction.*

*10. The atomizer wheel of claim 1 in which the taper of the bushing extends from the outer end thereof.*

*11. The atomizer wheel of claim 1 in which the inner end of each bushing projects into the chamber without contact with the inside of the outer wall part of the wheel.*

* * * * *